UNITED STATES PATENT OFFICE 2,432,458

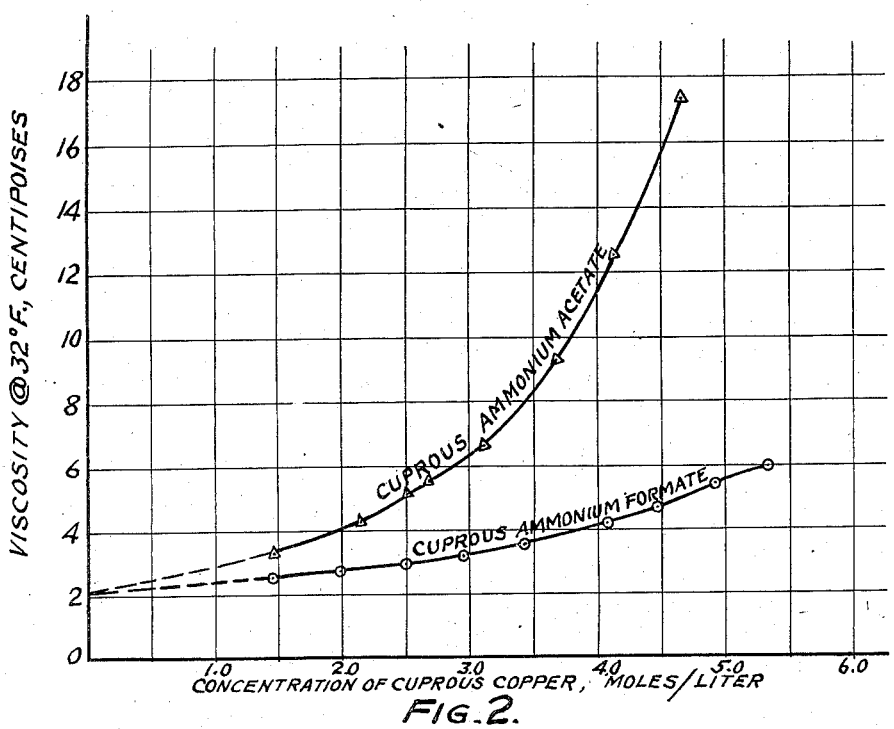
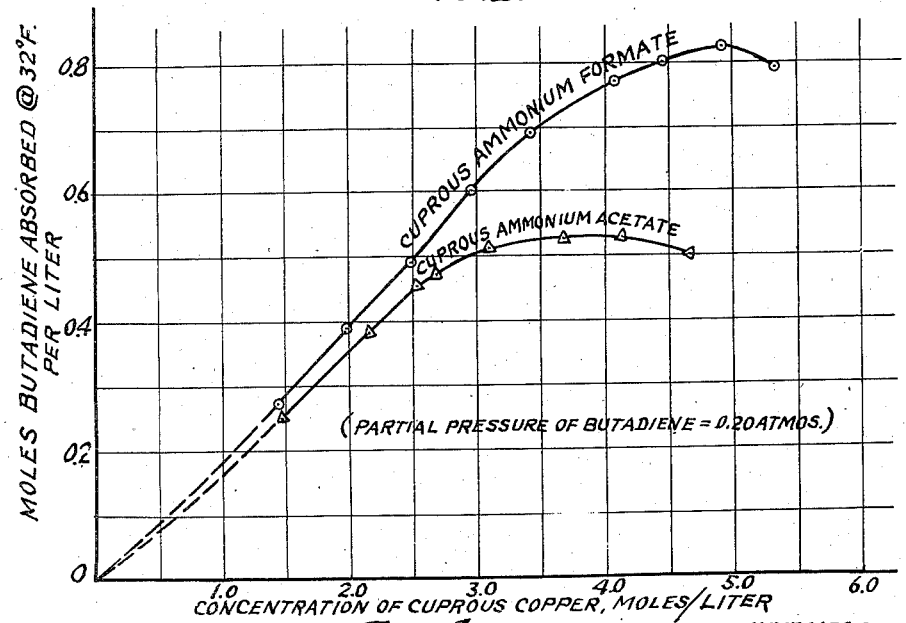

SEPARATION OF DIOLEFINS FROM HYDROCARBON MIXTURES WITH CUPROUS AMMONIUM FORMATE SOLUTIONS

Herbert C. Thober and Rolland G. Bowers, Toledo, Ohio, assignors to Sun Oil Company, Philadelphia, Pa., a corporation of New Jersey Application November 29, 1945, Serial No. 631,731

6 Claims. (Cl. 260—681.5)

This invention relates to the separation of relatively highly unsaturated hydrocarbons from less unsaturated hydrocarbons and particularly concerns a method in which such separation is effected by means of a selective absorbing agent comprising an aqueous solution of cuprous ammonium formate.

The invention is applicable particularly to the purification of a conjugated diolefin such as isoprene or butadiene, and its application to the purification of butadiene may be taken as illustrative. The commercial production of butadiene is at present widely practiced, for example, by means of catalytic dehydrogenation of more saturated $C_4$ hydrocarbons such as butane. The dehydrogenated product is obtained in the form of a crude mixture generally containing in the order of 20 per cent butadiene together with butenes and saturated $C_4$ hydrocarbons. It is common practice to purify the butadiene by contacting this crude mixture, in either vapor or liquid phase, with a liquid absorbing agent or solvent for selectively absorbing the butadiene and then recovering the butadiene by stripping it from the solution.

Many selective absorbing agents have been proposed for purifying the butadiene in a process of this type, but few have proved sufficiently satisfactory or efficient for commercial use. The absorbing agent which perhaps has heretofore been used most widely commercially comprises an aqueous solution of cuprous ammonium acetate. We have now found that a large improvement in the efficiency of extraction may be effected by using, as the selective absorbent, an aqueous solution of cuprous ammonium formate, provided however, that the concentration of the cuprous ammonium formate is maintained within a certain range, namely, about 3–5 moles per liter, as more fully discussed below.

In carrying out the separation, the procedure of utilizing the improved absorbing agent may follow known operational procedures for making such separations and the conventional types of absorbing and desorbing equipment may be used. For example, in the purification of butadiene from the crude mixture containing also butenes and saturated hydrocarbons the charge may be contacted in a plate or packed column with the cuprous ammonium formate solution at a reduced temperature, preferably about 32° F., to selectively absorb the butadiene. The resulting rich solution, which will contain, in addition to most of the butadiene present in the charge, a minor part of the butenes, may then be subjected to an initial stripping operation in a stripper column to remove the absorbed butenes along with a minor part of the butadiene, the mixture of stripped butenes and butadiene preferably being passed back to the absorption column so that the butadiene will be recovered. The absorbent solution, from which the butenes have been removed, may then be subjected to a second stripping operation in another stripper column to remove butadiene of high purity as the desired product and the lean absorbent solution may be passed back to the absorption column for reuse.

For the purpose of illustrating the improvement resulting from the use of cuprous ammonium formate as the absorbent or solvent according to the present invention, there is shown in Figures 1 and 2 of the accompanying drawings plots of experimental data affording a comparison between the cuprous ammonium formate and the known cuprous ammonium acetate solvent.

Figure 1 shows, for both the formate and the known acetate solvents, the relationship between concentration of cuprous copper in the solvent and its carrying or absorption capacity for butadiene, expressed as the moles of butadiene which will be absorbed by one liter of the solvent at equilibrium. A butadiene partial pressure of 0.20 atmosphere and a temperature of 32° F. were used in establishing the curves, since these values are generally representative of commercial operating conditions.

Figure 2 shows how the viscosity of each solvent changes as the concentration of cuprous copper varies. Viscosity is an important factor in the absorption operation since it influences the degree of contact between solvent and hydrocarbon phases and thus affects the efficiency of absorption. It, of course, is desirable that the viscosity be as low as possible consistent with a high carrying capacity of the solvent.

Considering first the known cuprous ammonium acetate solvent, Figure 1 shows that its carrying capacity improves in the low concentration range with increasing cuprous copper concentration (which, in terms of moles per liter, is identical with the cuprous ammonium acetate concentration). The carrying capacity reaches a value of about 0.5 mole butadiene absorbed per liter at a cuprous copper concentration of 3.0 moles per liter of the solvent. Further increase in the cuprous copper concentration, however, effects very little additional improvement in the carrying capacity. On the other hand, as shown by Figure 2, the viscosity of the acetate solvent increases very rapidly with increasing cuprous copper concentration, particularly after this concentration exceeds a value of 3.0 moles per liter. Accordingly, it is evident that, when using cuprous ammonium acetate solution as the absorbing agent, the concentration should not substantially exceed a value of 3.0 for best results, and in fact the concentration is customarily held at about this value in commercial practice.

Using aqueous cuprous ammonium formate as the absorbing agent, we have now found that although this solvent has only a slightly greater carrying capacity than does the acetate at concentrations substantially below 3 moles per liter, at concentrations above this value it is capable of absorbing very substantially larger amounts of butadiene than is possible when cuprous ammonium acetate is employed. This is shown in Figure 1, from which it may be seen that the carrying capacity of the formate increases as its concentration increases until a concentration of about 5.0 is reached, after which the carrying capacity decreases. On the other hand, as shown by Figure 2, the viscosity of the formate increases only slowly as compared to the rapid increase in the case of the acetate, so that even when the concentration reaches 5.0, the formate still has a somewhat lower viscosity than does the acetate when its molar concentration is only 3.0.

The combined effect of greater absorption or carrying capacity and lower viscosity renders the cuprous ammonium formate an outstanding absorbing agent when used at concentrations within the range of 3.5–5.0 moles per liter.

In addition to the aforesaid amount of cuprous ammonium formate, the absorbing agent should contain at least about 0.1 mole of cupric ammonium formate per liter but preferably not much in excess of this amount. This proportion of the cupric compound will prevent corrosion of steel equipment in which the desorbing agent is used, which corrosion otherwise will take place rapidly.

The desorbing agent also should contain ammonia in excess of that required to form the cuprous and cupric complexes, for example, 3 to 4 moles excess ammonia per liter. This will prevent precipitation of copper from solution, which otherwise is apt to occur during the stripping operation due to removal of ammonia. The concentration of excess ammonia should be maintained as above specified by adding ammonia to replace that removed during the stripping operation. The excess ammonia appears to have little if any effect on the absorptivity or the viscosity of the solution.

While several methods are available for preparing the cuprous ammonium formate solution, the most satisfactory method for commercial practice involves the aeration of warm ammonia-formic acid solution in contact with metallic copper. An aqueous solution of ammonia-formic acid is first prepared so as to contain the amount of formate ion and ammonia required to give the above specified concentrations. This solution is circulated at about 140° F. through a contact zone containing copper pebbles or shavings, and air is introduced into the bottom of the zone and bubbled through the solution. The rate of introducing the air is adjusted so as to regulate the concentration of cupric ammonium formate in the solution leaving the zone to the desired value. Ammonia may also be introduced into the zone to compensate for any ammonia removed with excess air. Circulation of the solution through the contact zone is continued until the desired concentration of cuprous ammonium formate is obtained, at which the concentration of the unused ammonium formate is preferably less than 0.2 mole per liter.

Having described our invention, what we claim and desire to protect by Letters Patent is:

1. Method of separating a conjugated diolefin having 4–5 carbon atoms per molecule from a hydrocarbon mixture containing the same together with less unsaturated hydrocarbons which comprises contacting the hydrocarbon mixture with a selective absorbing agent comprising an aqueous solution containing from 3.5 to 5.0 moles of cuprous ammonium formate per liter to selectively absorb the diolefin, and separating the absorbing agent from non-absorbed hydrocarbons.

2. Method of separating butadiene from a hydrocarbon mixture containing butadiene, butenes and saturated hydrocarbons which comprises contacting the hydrocarbon mixture with a selective absorbing agent comprising an aqueous solution containing from 3.5 to 5.0 moles of cuprous ammonium formate per liter to selectively absorb the butadiene, and separating the absorbing agent from non-absorbed hydrocarbons.

3. In a process for separating and purifying butadiene from a hydrocarbon charge containing butadiene, butenes and saturated hydrocarbons wherein the charge is contacted with a selective absorbing agent to obtain a rich solution of the butadiene together with a minor part of the butenes and in which the resulting rich solution is subjected to an initial stripping operation to remove said minor part of butenes and then to a second stripping operation to remove butadiene of high purity; the improvement which comprises using as said selective absorbing agent an aqueous solution of cuprous ammonium formate containing from 3.5 to 5.0 moles of the cuprous ammonium formate per liter.

4. The process according to claim 3 wherein the said aqueous solution also contains at least about 0.1 mole of cupric ammonium formate per liter and in the order of 3–4 moles of excess ammonia per liter.

5. Method according to claim 1 wherein the diolefin is butadiene.

6. Method according to claim 1 wherein the diolefin is isoprene.

HERBERT C. THOBER.
ROLLAND G. BOWERS.

REFERENCES CITED

The following references are of record in the file of this patent:

UNITED STATES PATENTS

| Number | Name | Date |
|---|---|---|
| 1,977,659 | Watts | Oct. 23, 1934 |
| 2,390,764 | Wolff | Dec. 11, 1945 |
| 2,388,928 | Morrell et al. | Nov. 13, 1945 |

FOREIGN PATENTS

| Number | Country | Date |
|---|---|---|
| 424,843 | Great Britain | Mar. 1, 1935 |